United States Patent
Brazeau

(10) Patent No.: US 9,604,358 B1
(45) Date of Patent: Mar. 28, 2017

(54) SECONDARY ROBOTIC CATCH APPARATUS AND METHOD

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/965,093

(22) Filed: Dec. 10, 2015

(51) Int. Cl.
| | |
|---|---|
| B25J 9/00 | (2006.01) |
| B25J 9/16 | (2006.01) |
| B65G 65/02 | (2006.01) |
| B65G 1/04 | (2006.01) |
| B65G 59/00 | (2006.01) |

(52) U.S. Cl.
CPC ............. *B25J 9/0096* (2013.01); *B25J 9/162* (2013.01); *B25J 9/1682* (2013.01); *B65G 1/04* (2013.01); *B65G 59/00* (2013.01); *B65G 65/02* (2013.01)

(58) Field of Classification Search
CPC ........ B25J 9/162; B25J 9/1682; B25J 9/0096; B65G 1/04; B65G 65/02; B65G 59/00
See application file for complete search history.

(56) References Cited

U.S. PATENT DOCUMENTS

| | | | |
|---|---|---|---|
| 8,280,547 B2 | 10/2012 | D'Andrea et al. | |
| 8,965,563 B2 * | 2/2015 | Eldershaw | B65G 47/00 700/218 |
| 8,967,691 B2 * | 3/2015 | Mueller | B65G 11/023 193/2 R |
| 9,087,314 B2 | 7/2015 | Hoffman et al. | |
| 9,387,982 B1 * | 7/2016 | Corey, Jr. | B65G 37/00 |
| 2014/0154036 A1 * | 6/2014 | Mattern | B25J 9/1612 414/729 |
| 2014/0341694 A1 * | 11/2014 | Girtman | B65G 67/24 414/796.5 |
| 2015/0332213 A1 * | 11/2015 | Galluzzo | B25J 5/007 700/216 |
| 2015/0335531 A1 * | 11/2015 | Yuyama | A61J 1/20 141/18 |
| 2015/0352721 A1 * | 12/2015 | Wicks | B25J 9/1664 700/228 |
| 2015/0360882 A1 * | 12/2015 | Girtman | B65G 59/02 700/213 |

* cited by examiner

*Primary Examiner* — Thomas Randazzo
(74) *Attorney, Agent, or Firm* — Kilpatrick Townsend & Stockton LLP

(57) ABSTRACT

Inventory management systems and related methods employ a catching member to selectively catch items dropped by a robotic manipulator. A related method includes controlling a robotic manipulator to move an inventory item from a first location to a second location. A catching member is selectively positioned to catch the inventory item if dropped by the robotic manipulator prior to the item reaching the second location. The catching member is moved to a suitable location for subsequent processing of one or more items dropped by the first robotic manipulator into the catching member.

18 Claims, 13 Drawing Sheets

SECONDARY ROBOTIC CATCH APPARATUS AND METHOD

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
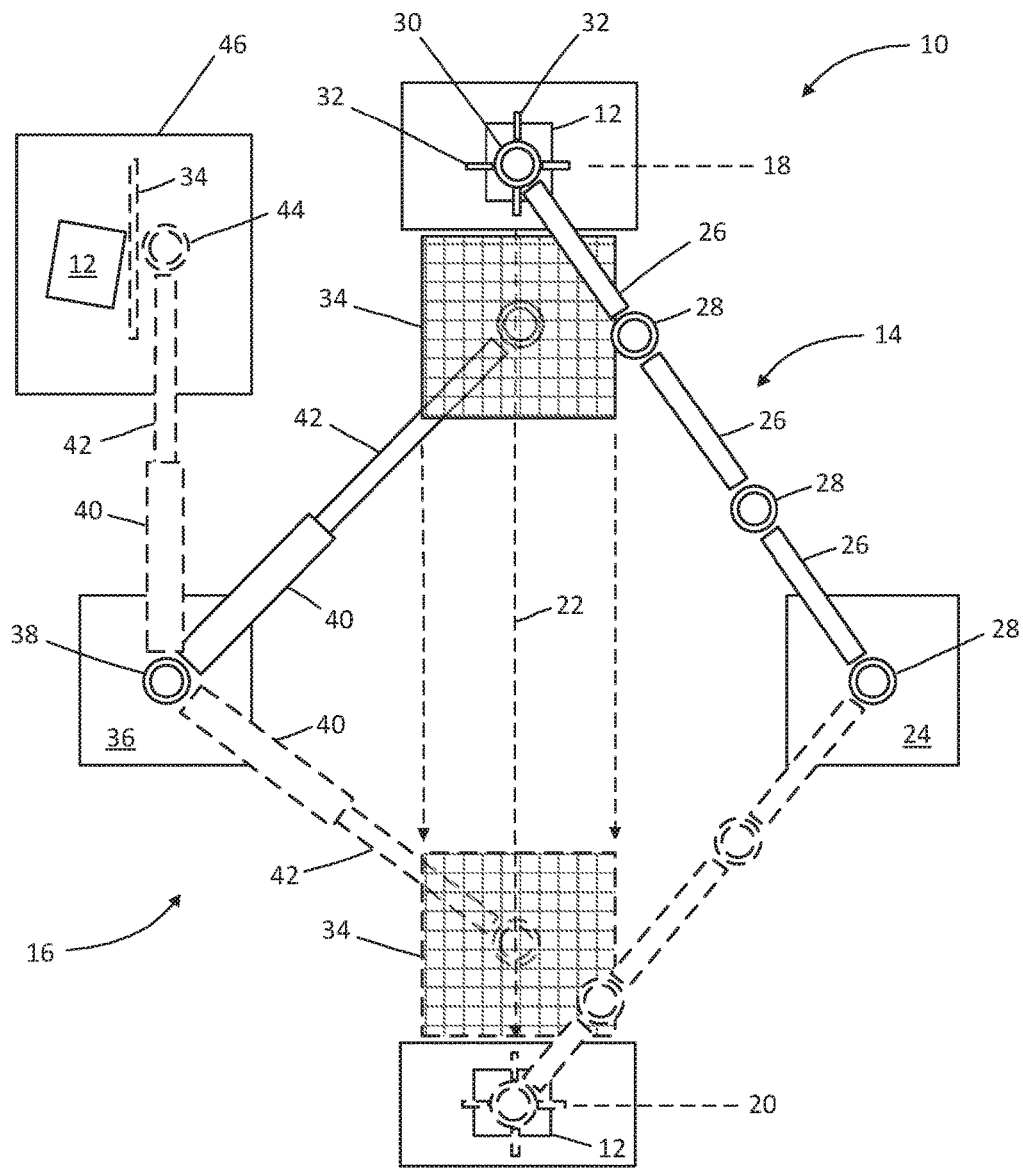
FIG. 1 illustrates a robotic system for moving items within an inventory system, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to systems that include a robotic manipulator for moving an item and a catching assembly for processing items if dropped by the robotic manipulator prior to reaching the desired location for the item. Any suitable assemblies and approaches can be used to catch and process items dropped by the robotic manipulator, such as the assemblies and approaches described herein, which provide for catching and moving of dropped items so as to require reduced or no human intervention, thereby decreasing the human effort needed to deal with items dropped by robotic manipulators.

Thus, in one aspect, an inventory management system is provided that includes a robotic manipulator, a catching member, and a management module. The robotic manipulator is configured to move an item from a first location to a second location. The catching member is configured to catch the item if dropped by the robotic manipulator prior to the item reaching the second location. The catching member is configured to be moved to carry the dropped item to a suitable location for subsequent processing. The management module is configured to generate instructions to cause the first robotic manipulator to grasp the item at the first location and move the item to the second location. The management module is further configured to generate instructions to cause any items held by the catching member to be moved to a suitable location for subsequent processing.

In another aspect, an inventory management system is provided that includes a robotic manipulator, a catching member, and a management module. The robotic manipulator is configured to grasp any item of a plurality of items, move the item from a first location to a second location and release the item at the second location. The plurality of items includes at least some items that differ from one another. The catching member is moved in coordination with the movement of the item by the robotic manipulator to position the catching member to catch the item if dropped by the robotic manipulator prior to the item reaching the second location. The management module is configured to generate instructions to cause the robotic manipulator to grasp the item at the first location and move the item to the second location. The management module is further configured to generate instructions to cause the catching member to move in coordination with the movement of the item by the robotic manipulator to position the catching member to catch the item if dropped by the first robotic manipulator prior to the item reaching the second location.

In another aspect, a computer-implemented method is provided that can be used in inventory management. The computer-implemented method includes controlling a robotic manipulator to move an inventory item within an inventory facility from a first location to a second location, positioning a catching member to catch the inventory item if dropped by the first robotic manipulator prior to the item reaching the second location, and moving the catching member to a suitable location for subsequent processing of one or more items dropped by the first robotic manipulator into the catching member.

Turning now to the drawings in which like reference numbers refer to like elements, FIG. 1 illustrates a robotic system 10 for moving items (e.g., item 12) within an inventory system, in accordance with many embodiments. The robotic system 10 includes a first robotic manipulator 14 used to move items within the inventory system and a second robotic manipulator 16 used to catch and process any items if dropped by the first robotic manipulator 14.

FIG. 1 illustrates the first robotic manipulator 14 moving the item 12 from a first location 18 to a second location 20 along an item movement path 22. In many embodiments, the first robotic manipulator 14 is capable of moving any of a suitable plurality of different items between any suitable locations within reach of the first robotic manipulator 14. In the illustrated embodiment, the robotic manipulator 14 includes a base 24, links 26, articulable joints 28, and an end effector 30. The end effector 30 includes grasping member 32 and in many embodiments is configured to be capable of grasping and moving items having different physical characteristics (e.g., shape, size, weight, surface texture, etc.). The first robotic manipulator 14 can be used to move selected items from any suitable starting location (e.g., an inventory holder, a pallet, a tote, etc.) to any suitable destination location (e.g., a collector tote for items to be packaged, an inventory holder, etc.).

The second robotic manipulator 16 includes a catching member 34 that is moved in coordination with the movement of the item 12 so that the catching member 34 is positioned to catch the item 12 if dropped by the first robotic manipulator 14. The second robotic manipulator 16 can have any configuration suitable for moving the catching member 34 in coordination with the movement of the item 12 along the movement path 22. In the illustrated embodiment, the second robotic manipulator 16 includes a base 36, a first joint 38, a first link 40, a second link 42, a second joint 44 and the catching member 34. The first link 40 is rotatable relative to the base 36 via articulation of the first joint 38. The second link 42 is extensible relative to the first link 40 via a suitable mechanism. In the illustrated embodiment, the second joint 44 is articulable to orient the catching member 34 in a position for catching an item dropped by the first robotic manipulator 14 and to reorient the catching member 34 to drop any item in the catching member 34 at a suitable location, such as in a collector tote 46 as illustrated in FIG. 1.

While a particular configuration of the second robotic manipulator 16 is illustrated in FIG. 1, the second robotic manipulator can have any suitable configuration. For example, the second robotic manipulator can be configured the same as the first robotic manipulator 14 and the end effector 30 of each of the first and second robotic manipulators 14, 16 can be used to simultaneously hold onto the item 12 while the first and second robotic manipulators 14, 16 are moved in coordination to move the item 12 from the first location 18 to the second location 20. As another example, the second robotic manipulator can be configured similar to the first robotic manipulator 14 but with the second robotic manipulator including the catching member 34 instead of the end effector 30.

In many embodiments, the robotic system 10 is configured to detect when an item has been dropped by the first robotic manipulator 14 and can be further configured to detect when an item has been caught by the catching member 34. For example, the first robotic manipulator 14 can include a component mounted local to the end effector 30 (e.g., a contact switch, a visual sensor, etc.) and configured to detect if the item 12 is held or not held by the end effector 30. The robotic system 10 can include an independent system (e.g., a vision system, a weight sensor, etc.) to determine whether the item 12 has been delivered to the second location. The second robotic manipulator 16 can include a component(s) (e.g., a weight sensor, a light beam(s) and a sensor(s), etc.) configured to detect when an item has been caught by the catching member 34.

The robotic system 10 can be operated in any suitable manner. For example, FIG. 1 illustrates operation of the second robotic manipulator 16 to move items within the catching member 34 and drop the items into a collector tote 46 for exception processing. The collector tote 46 can be moved to any suitable location for processing of the items in the collector tote 46. For example, a mobile drive unit as described herein can be used to lift the collector tote 46 and transport the collector tote 46 to another location suitable for processing the items in the collector tote 46. In alternate embodiments, upon detecting the dropping of an item by the first robotic manipulator 14 into the catching member 34, the first robotic manipulator 14 can be operated to grasp the item from the catching member 34 and resume moving the item to the second location 18.

The catching member 34 can have any suitable configuration for catching dropped items so as to minimize resulting damage to the dropped item. For example, in the illustrated embodiment the catching member 34 includes a net having a suitable stiffness to cushion the fall of the item while being sufficiently stiff to accommodate removal of the item from the net without the item becoming caught in the net or the net otherwise interfering with removal of the item from the net. As another example, the catching member 34 can include a suitably padded container.

In some embodiments, a characteristic of the catching member 34 can be adjusted, for example, to reduce impact forces acting on a dropped item 12. For example, a surface of the catching member 34 may be adjusted to absorb force and reduce a risk of bouncing or intensity of bouncing of the dropped item 12, and/or the surface of the catching member 34 may be adjusted to increase forces that are likely to cause the caught item 12 to slide to a desired location, rather than sticking.

The surface of the catching member 34 may be manipulated, for example, by changing an angle of the surface. The angle can correspond to a deviation from any other suitable reference. Any suitable structure for modifying the angle of the surface may be utilized. For example, the angle of the surface can be adjusted by rotating a body having the surface about a pivot. For example, changing the angle of the surface may increase a likelihood that a caught item 12 with a high-friction surface characteristic will slide down the surface toward the desired location.

In some embodiments, the surface of the catching member 34 can be changed in resilience. For example, the surface may correspond to a fabric or mesh surface that can be made more or less taut, such as by controlling operation of a suitable mechanism such as spools or a spring. In some embodiments, a biasing mechanism, such as a spring, can provide a shock-absorbing effect, e.g., to reduce momentum or otherwise absorb forces acting on the caught item 12. In some scenarios, a stiffness of a spring or other biasing mechanism can be variable, e.g., allowing an amount of shock-absorption to be controlled through automation in response to information about the dropped item 12 and/or the trajectory of the dropped item 12. In some examples, changing a resilience may decrease a risk that a dropped item 12 with a bouncy surface characteristic will bounce over or away from the catching member 34.

In some aspects, a material of the surface the catching member 34 may be changed. For example, a body can be rotated so that a foam surface can be rotated and positioned in the path of the trajectory of the dropped item 12. Any other suitable mechanism for substituting and/or modifying a characteristic of the surface of the catching member 34 may additionally or alternatively be used. Non-limiting examples include manipulating the catching member 34 (such as substituting or changing the material of the catching member 34) to change surface characteristics such as friction, electrical conductivity, resilience, magnetism, etc.

The second robotic manipulator 16 can be selectively employed based on characteristics of the item being moved by the first robotic manipulator 14. For example, the second robotic manipulator 16 can be employed only for selected items (e.g., expensive items, items that are hard to move without dropping, items likely to be damaged when dropped, items having a low in-inventory quantity, etc.). The second robotic manipulator 16 can remain un-activated for other selected items (e.g., items not likely to be dropped, inexpensive items, items not easily damaged via dropping, or items that if dropped have a low impact).

Figure 2:
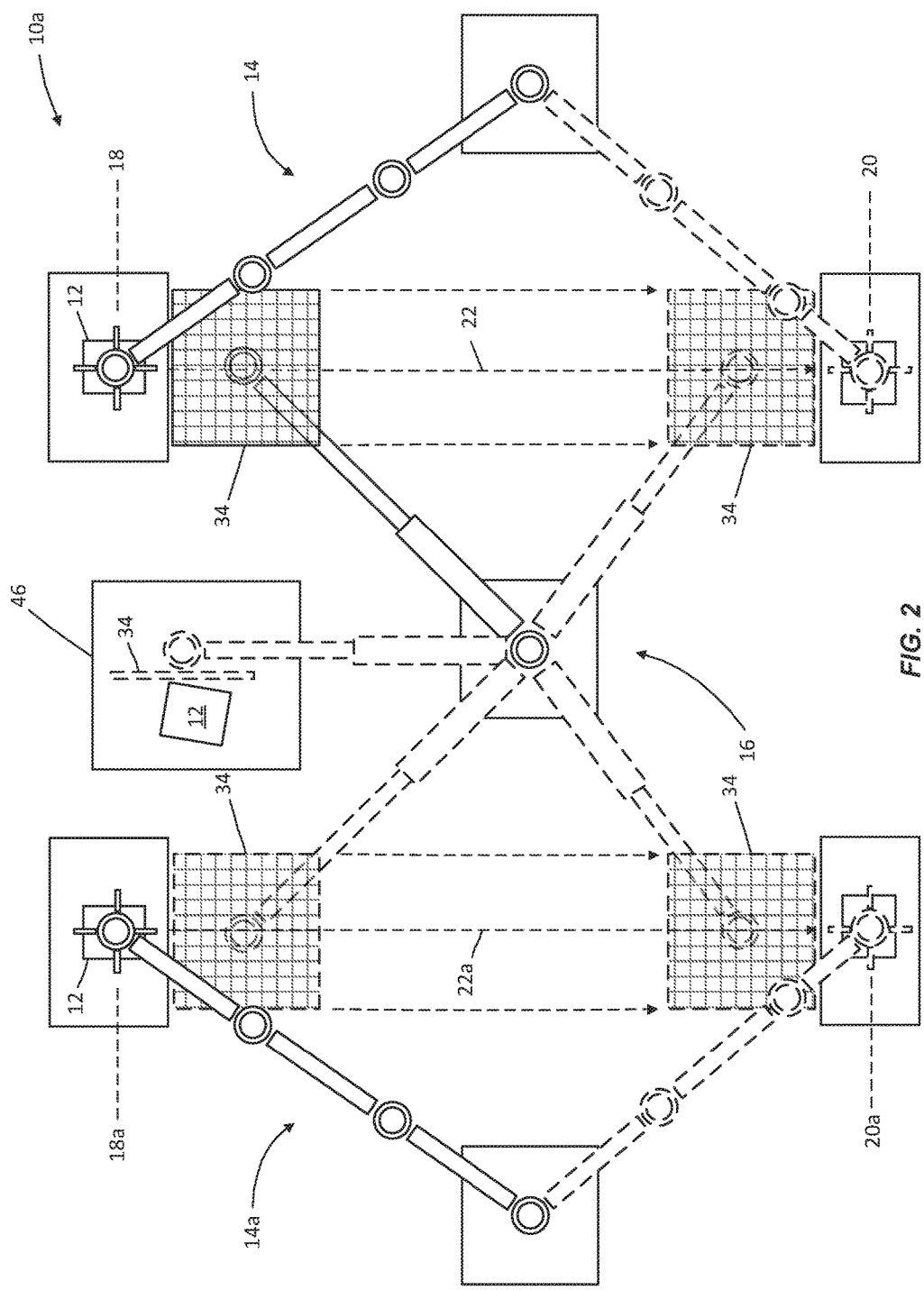
FIG. 2 illustrates a variant of the robotic system of FIG. 1, in accordance with many embodiments.

FIG. 2 illustrates a variant 10a of the robotic system 10 that further includes a third robotic manipulator 14a. Similar to the first robotic manipulator 14, the third robotic manipulator 14a is configured to move an item 12 from a first location 18a to a second location 20a along a movement path 22a. In many embodiments, the third robotic manipulator 14a is capable of moving any of a suitable plurality of different items between any suitable locations within reach of the third robotic manipulator 14a. In the illustrated embodiment, the second robotic manipulator 16 is operable to move the catching member 34 in coordination with the movement of the item 12 by the first robotic manipulator 14 along the movement path 22 and to move the catching member 34 in coordination with the movement of the item 12 by the third robotic manipulator 14a along the movement path 22a. The second robotic manipulator 16 can be selectively employed to position the catching member 34 along either of the movement paths 22, 22a based on any suitable criteria. For example, when both of the first and third robotic manipulators are moving an object, the second robotic manipulator 16 can be operated to cover one of the movement paths (e.g., 22) instead of the other movement path based on object value, likelihood of dropping, available quantity in inventory, likelihood of sustaining damage if dropped, and/or any other suitable criteria.

Figure 3:
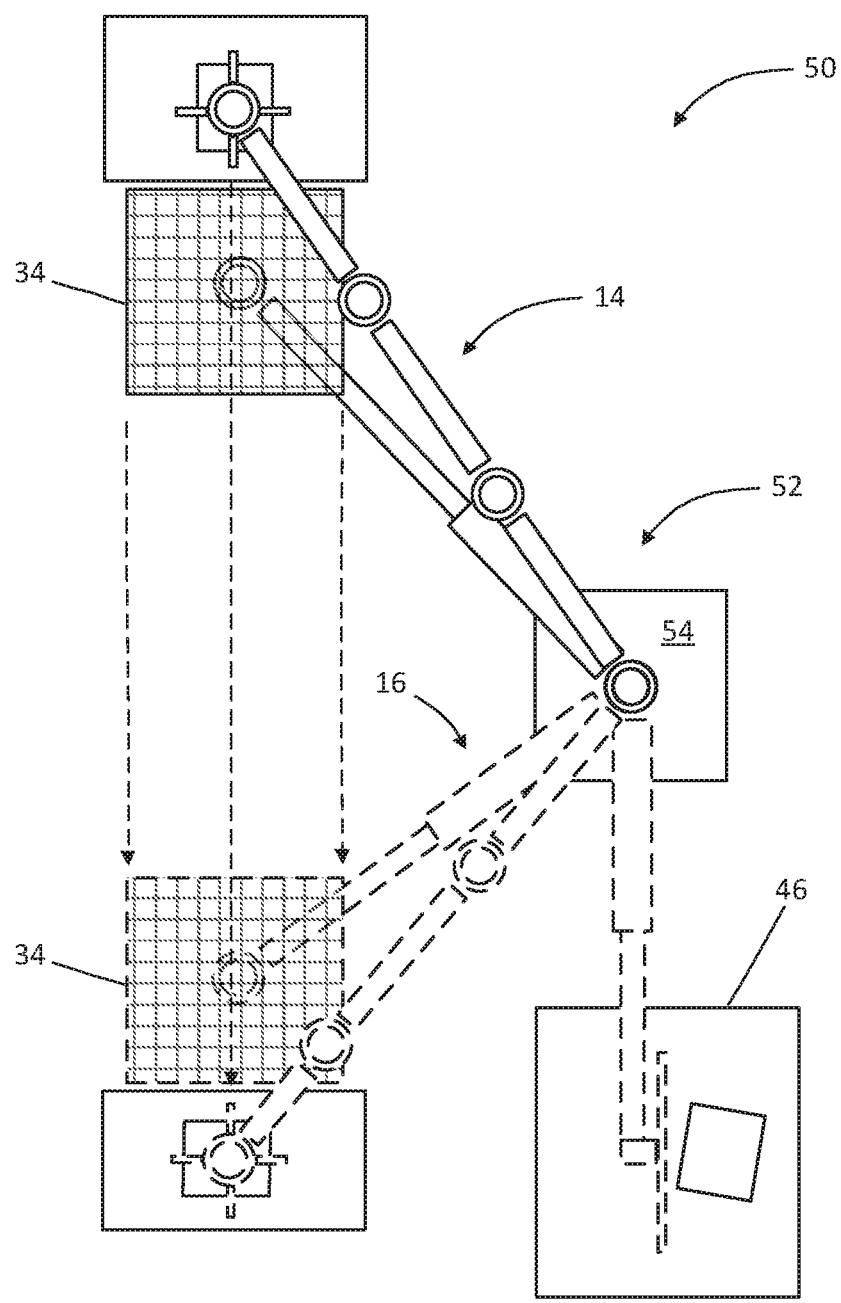
FIG. 3 illustrates moving an item and a catching member with an integrated robotic manipulator assembly so as to position the catching member to catch the item if dropped by the first robotic manipulator, in accordance with many embodiments.

FIG. 3 illustrates a robotic system 50 for moving items (e.g., item 12) within an inventory system, in accordance with many embodiments. The robotic system 50 is configured similar to the robotic system 10, but includes an integrated robotic manipulator 52 that includes the first and second robotic manipulators 14, 16 supported by a common base 54. Because the components and functionality of the robotic system 50 is similar to the robotic system 10, the description herein with regard to the robotic system 10 is applicable to the robotic system 50 (and vice-versa) and is therefore not repeated here.

Figure 4:
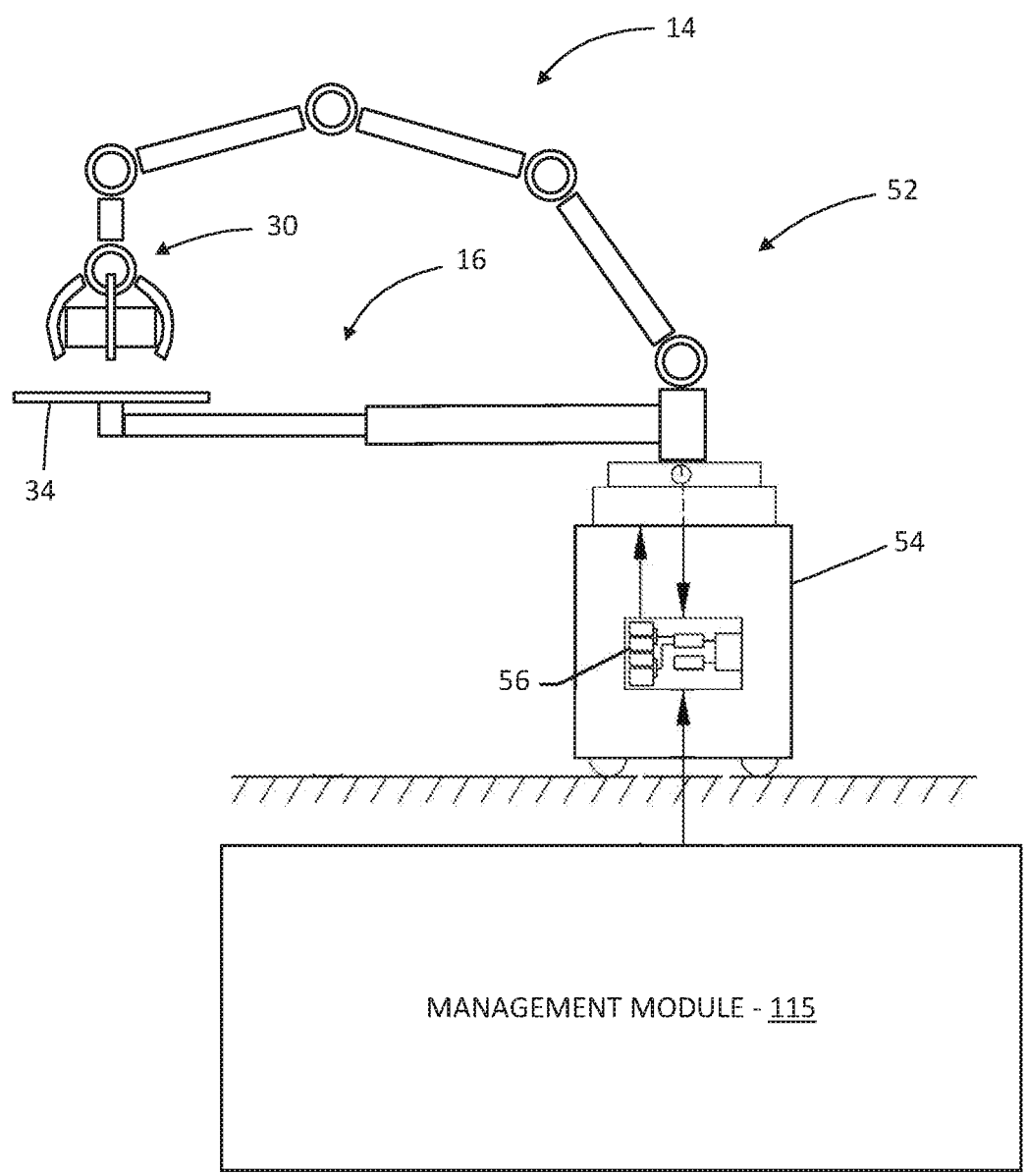
FIG. 4 further illustrates the integrated robotic manipulator assembly of FIG. 3.

FIG. 4 further illustrates the robotic system 50. In many embodiments, the integrated robotic manipulator 52 includes a controller 56 configured to control operation of the robotic manipulator 52. In the illustrated embodiment, the controller 56 is in communication with a management module 115 that provides instructions and/or data to the controller 56 with respect to items to be moved by the robotic system 50. For example, the management module 115 can identify an item to be moved, the starting location of the item, the desired ending location of the item, and relevant physical characteristics (e.g., size, shape, weight, etc.) of the item to be moved. The management module 115 can communicate whether the controller 56 should activate the second robotic manipulator 16 in view of the characteristics of the item to be moved as described herein. In many embodiments, the controller 56 (by itself or in combination with the management module 115) controls the integrated robotic manipulator 52 to operate the robotic manipulator as described herein. In many embodiments, the robotic system 10 is configured similar to the robotic system 50 and includes the controller 56 so that the description herein with respect to the robotic system 50 and the controller 56 is applicable to the robotic system 10 and is therefore not repeated here.

Figure 5:
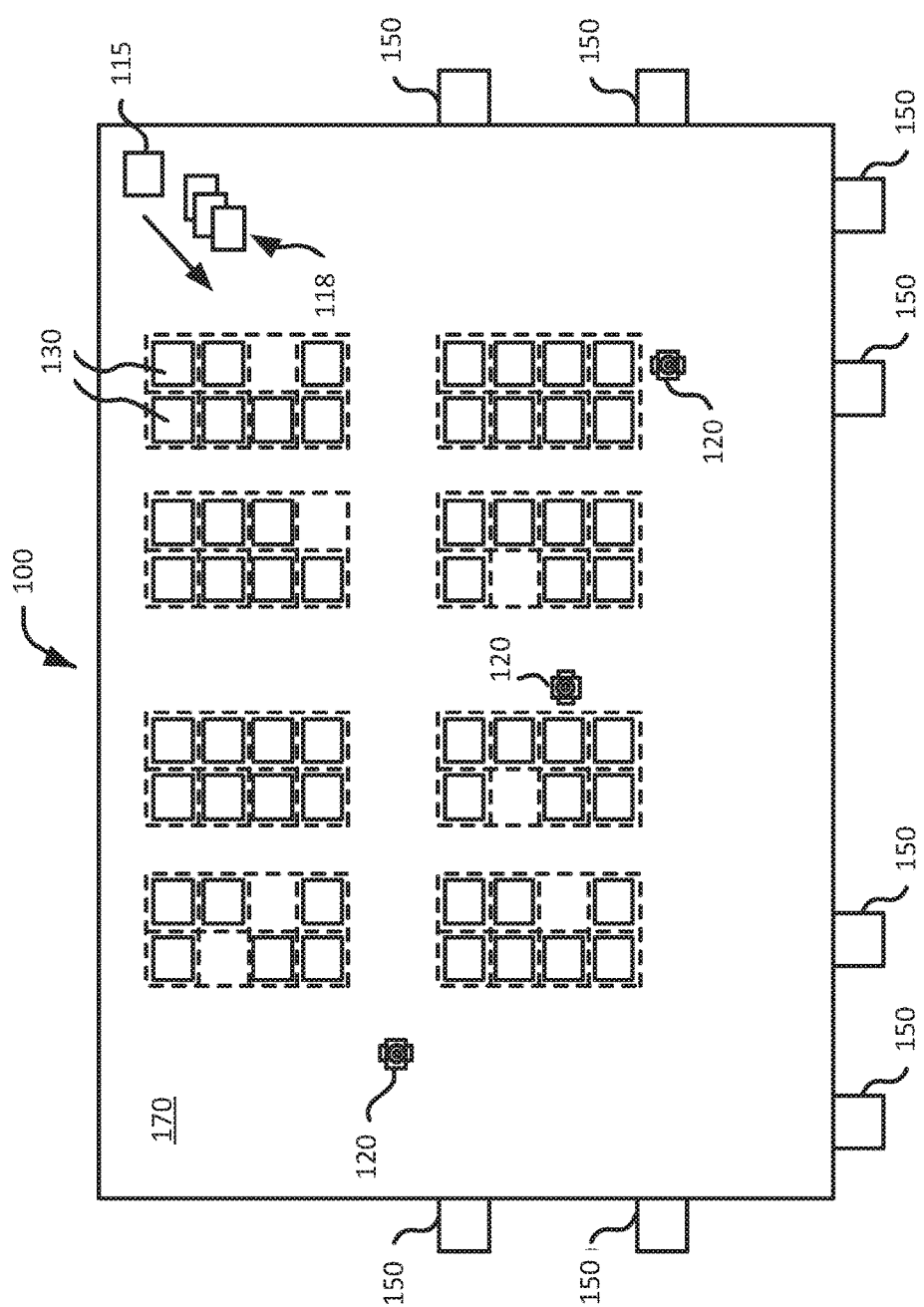
FIG. 5 illustrates components of an inventory system according to a particular embodiment.

FIG. 5 illustrates the components of an inventory system 100 in which the robotic systems 10, 50, 60, 70 can be used. The inventory system 100 includes the management module 115, one or more mobile drive units 120, one or more inventory holders 130, and one or more inventory stations 150. The mobile drive units 120 transport the inventory holders 130 between points within a workspace 170 in response to commands communicated by the management module 115. Each inventory holder 130 stores one or more types of inventory items. As a result, the inventory system 100 is capable of moving inventory items between locations within the workspace 170 to facilitate the entry, processing, and/or removal of inventory items from the inventory system 100 and the completion of other tasks involving inventory items.

The management module 115 assigns tasks to appropriate components of the inventory system 100 and coordinates operation of the various components in completing the tasks. These tasks may relate not only to the movement and processing of inventory items, but also to the management and maintenance of the components of the inventory system 100. For example, the management module 115 may assign portions of the workspace 170 as parking spaces for the mobile drive units 120, the scheduled recharge or replacement of mobile drive unit batteries, the storage of empty inventory holders 130, or any other operations associated with the functionality supported by the inventory system 100 and its various components. The management module 115 may select components of the inventory system 100 to perform these tasks and communicate appropriate commands and/or data to the selected components to facilitate completion of these operations. Although shown in FIG. 5 as a single, discrete component, the management module 115 can include multiple components and may represent or include portions of the mobile drive units 120 or other elements of the inventory system 100, such as the first and second robotic manipulators 14, 16. As a result, any or all of the interactions between a particular mobile drive unit 120 and the management module 115 that are described herein may, in particular embodiments, represent peer-to-peer communication between that mobile drive unit 120 and one or more other mobile drive units 120. The components and operation of an example embodiment of management module 115 are discussed further below with respect to FIG. 6.

The mobile drive units 120 move the inventory holders 130 between locations within the workspace 170. The mobile drive units 120 may represent any devices or components appropriate for use in the inventory system 100 based on the characteristics and configuration of the inventory holders 130 and/or other elements of the inventory system 100. In a particular embodiment of the inventory system 100, the mobile drive units 120 represent independent, self-powered devices configured to freely move about the workspace 170. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 120 represent elements of a tracked inventory system configured to move inventory holder 130 along tracks, rails, cables, crane system, or other guidance or support elements traversing the workspace 170. In such an embodiment, the mobile drive units 120 may receive power and/or support through a connection to the guidance elements, such as a powered rail. Additionally, in particular embodiments of the inventory system 100 the mobile drive units 120 may be configured to utilize alternative conveyance equipment to move within the workspace 170 and/or between separate portions of the workspace 170. The components and operation of an example embodiment of a mobile drive unit 120 are discussed further below with respect to FIGS. 7 and 8.

Additionally, the mobile drive units 120 may be capable of communicating with management module 115 to receive information identifying selected inventory holders 130, transmit the locations of the mobile drive units 120, or exchange any other suitable information to be used by the management module 115 or the mobile drive units 120 during operation. The mobile drive units 120 may communicate with management module 115 wirelessly, using wired connections between the mobile drive units 120 and the management module 115, and/or in any other appropriate manner. As one example, particular embodiments of the mobile drive unit 120 may communicate with the management module 115 and/or with one another using 802.11, Bluetooth, or Infrared Data Association (IrDA) standards, or any other appropriate wireless communication protocol. As another example, in a tracked inventory system 100, tracks or other guidance elements upon which the mobile drive units 120 move may be wired to facilitate communication between the mobile drive units 120 and other components of the inventory system 100. Furthermore, as noted above, the management module 115 may include components of individual mobile drive units 120. Thus, for the purposes of this description and the claims that follow, communication between the management module 115 and a particular mobile drive unit 120 may represent communication between components of a particular mobile drive unit 120. In general, the mobile drive units 120 may be powered, propelled, and controlled in any manner appropriate based on the configuration and characteristics of the inventory system 100.

The inventory holders 130 store inventory items. In a particular embodiment, the inventory holders 130 include multiple storage bins with each storage bin capable of holding one or more types of inventory items. The inventory holders 130 are capable of being carried, rolled, and/or otherwise moved by the mobile drive units 120. In particular embodiments, the inventory holder 130 may provide additional propulsion to supplement that provided by the mobile drive unit 120 when moving the inventory holder 130.

Additionally, in particular embodiments, the inventory items may also hang from hooks or bars (not shown) within or on the inventory holder 130. In general, the inventory holder 130 may store the inventory items in any appropriate manner within the inventory holder 130 and/or on the external surface of the inventory holder 130.

Additionally, each inventory holder 130 may include a plurality of faces, and each bin may be accessible through one or more faces of the inventory holder 130. For example, in a particular embodiment, the inventory holder 130 includes four faces. In such an embodiment, bins located at a corner of two faces may be accessible through either of those two faces, while each of the other bins is accessible through an opening in one of the four faces. The mobile drive unit 120 may be configured to rotate the inventory holder 130 at appropriate times to present a particular face and the bins associated with that face to an operator or other components of the inventory system 100.

Inventory items represent any objects suitable for storage, retrieval, and/or processing in the automated inventory system 100. For the purposes of this description, "inventory items" may represent any one or more objects of a particular type that are stored in the inventory system 100. Thus, a particular inventory holder 130 is currently "storing" a particular inventory item if the inventory holder 130 currently holds one or more units of that type. As one example, the inventory system 100 may represent a mail order warehouse facility, and inventory items may represent merchandise stored in the warehouse facility. During operation, the mobile drive units 120 may retrieve the inventory holders 130 containing one or more inventory items requested in an order to be packed for delivery to a customer or inventory holders 130 carrying pallets containing aggregated collections of inventory items for shipment. Moreover, in particular embodiments of the inventory system 100, boxes containing completed orders may themselves represent inventory items.

In particular embodiments, the inventory system 100 may also include one or more inventory stations 150. The inventory stations 150 represent locations designated for the completion of particular tasks involving inventory items. Such tasks may include the removal of inventory items from the inventory holders 130, the introduction of inventory items into the inventory holders 130, the counting of inventory items in the inventory holders 130, the decomposition of inventory items (e.g. from pallet- or case-sized groups to individual inventory items), the consolidation of inventory items between the inventory holders 130, and/or the processing or handling of inventory items in any other suitable manner. In particular embodiments, the inventory stations 150 may just represent the physical locations where a particular task involving inventory items can be completed within the workspace 170. In alternative embodiments, the inventory stations 150 may represent both the physical location and also any appropriate equipment for processing or handling inventory items, such as scanners for monitoring the flow of inventory items in and out of the inventory system 100, communication interfaces for communicating with the management module 115, and/or any other suitable components. The inventory stations 150 may be controlled, entirely or in part, by human operators or may be fully automated. Moreover, the human or automated operators of the inventory stations 150 may be capable of performing certain tasks to inventory items, such as packing, counting, or transferring inventory items, as part of the operation of the inventory system 100.

The workspace 170 represents an area associated with the inventory system 100 in which the mobile drive units 120 can move and/or the inventory holders 130 can be stored.

For example, the workspace 170 may represent all or part of the floor of a mail-order warehouse in which the inventory system 100 operates. Although FIG. 5 shows, for the purposes of illustration, an embodiment of the inventory system 100 in which the workspace 170 includes a fixed, predetermined, and finite physical space, particular embodiments of the inventory system 100 may include the mobile drive units 120 and the inventory holders 130 that are configured to operate within a workspace 170 that is of variable dimensions and/or an arbitrary geometry. While FIG. 5 illustrates a particular embodiment of the inventory system 100 in which the workspace 170 is entirely enclosed in a building, alternative embodiments may utilize workspaces 170 in which some or all of the workspace 170 is located outdoors, within a vehicle (such as a cargo ship), or otherwise unconstrained by any fixed structure.

In operation, the management module 115 selects appropriate components to complete particular tasks and transmits task assignments 118 to the selected components to trigger completion of the relevant tasks. Each task assignment 118 defines one or more tasks to be completed by a particular component. These tasks may relate to the retrieval, storage, replenishment, and counting of inventory items and/or the management of the mobile drive units 120, the inventory holders 130, the inventory stations 150 and other components of the inventory system 100. Depending on the component and the task to be completed, a particular task assignment 118 may identify locations, components, and/or actions associated with the corresponding task and/or any other appropriate information to be used by the relevant component in completing the assigned task.

In particular embodiments, the management module 115 generates task assignments 118 based, in part, on inventory requests that the management module 115 receives from other components of the inventory system 100 and/or from external components in communication with the management module 115. These inventory requests identify particular operations to be completed involving inventory items stored or to be stored within the inventory system 100 and may represent communication of any suitable form. For example, in particular embodiments, an inventory request may represent a shipping order specifying particular inventory items that have been purchased by a customer and that are to be retrieved from the inventory system 100 for shipment to the customer. The management module 115 may also generate task assignments 118 independently of such inventory requests, as part of the overall management and maintenance of the inventory system 100. For example, the management module 115 may generate task assignments 118 in response to the occurrence of a particular event (e.g., in response to a mobile drive unit 120 requesting a space to park), according to a predetermined schedule (e.g., as part of a daily start-up routine), or at any appropriate time based on the configuration and characteristics of the inventory system 100. After generating one or more task assignments 118, the management module 115 transmits the generated task assignments 118 to appropriate components for completion of the corresponding task. The relevant components then execute their assigned tasks.

With respect to the mobile drive units 120 specifically, the management module 115 may, in particular embodiments, communicate task assignments 118 to selected mobile drive units 120 that identify one or more destinations for the selected mobile drive units 120. The management module 115 may select a mobile drive unit 120 to assign the relevant task based on the location or state of the selected mobile drive unit 120, an indication that the selected mobile drive unit 120 has completed a previously-assigned task, a predetermined schedule, and/or any other suitable consideration. These destinations may be associated with an inventory request the management module 115 is executing or a management objective the management module 115 is attempting to fulfill. For example, the task assignment may define the location of an inventory holder 130 to be retrieved, an inventory station 150 to be visited, a storage location where the mobile drive unit 120 should park until receiving another task, or a location associated with any other task appropriate based on the configuration, characteristics, and/or state of the inventory system 100, as a whole, or individual components of the inventory system 100. For example, in particular embodiments, such decisions may be based on the popularity of particular inventory items, the staffing of a particular inventory station 150, the tasks currently assigned to a particular mobile drive unit 120, and/or any other appropriate considerations.

As part of completing these tasks the mobile drive units 120 may dock with and transport the inventory holders 130 within the workspace 170. The mobile drive units 120 may dock with the inventory holders 130 by connecting to, lifting, and/or otherwise interacting with the inventory holders 130 in any other suitable manner so that, when docked, the mobile drive units 120 are coupled to and/or support the inventory holders 130 and can move the inventory holders 130 within the workspace 170. While the description below focuses on particular embodiments of the mobile drive unit 120 and the inventory holder 130 that are configured to dock in a particular manner, alternative embodiments of the mobile drive unit 120 and the inventory holder 130 may be configured to dock in any manner suitable to allow the mobile drive unit 120 to move the inventory holder 130 within the workspace 170. Additionally, as noted below, in particular embodiments, the mobile drive units 120 represent all or portions of the inventory holders 130. In such embodiments, the mobile drive units 120 may not dock with the inventory holders 130 before transporting the inventory holders 130 and/or the mobile drive units 120 may each remain continually docked with a particular inventory holder 130.

While the appropriate components of the inventory system 100 complete assigned tasks, the management module 115 may interact with the relevant components to ensure the efficient use of space, equipment, manpower, and other resources available to the inventory system 100. As one specific example of such interaction, the management module 115 is responsible, in particular embodiments, for planning the paths the mobile drive units 120 take when moving within the workspace 170 and for allocating use of a particular portion of the workspace 170 to a particular mobile drive unit 120 for purposes of completing an assigned task. In such embodiments, the mobile drive units 120 may, in response to being assigned a task, request a path to a particular destination associated with the task. Moreover, while the description below focuses on one or more embodiments in which the mobile drive unit 120 requests paths from the management module 115, the mobile drive unit 120 may, in alternative embodiments, generate its own paths.

Components of the inventory system 100 may provide information to the management module 115 regarding their current state, other components of the inventory system 100 with which they are interacting, and/or other conditions relevant to the operation of the inventory system 100. This may allow the management module 115 to utilize feedback from the relevant components to update algorithm parameters, adjust policies, or otherwise modify its decision-making to respond to changes in operating conditions or the occurrence of particular events.

In addition, while the management module 115 may be configured to manage various aspects of the operation of the components of the inventory system 100, in particular embodiments, the components themselves may also be responsible for decision-making relating to certain aspects of their operation, thereby reducing the processing load on the management module 115.

Thus, based on its knowledge of the location, current state, and/or other characteristics of the various components of the inventory system 100 and an awareness of all the tasks currently being completed, the management module 115 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 100 may be able to support a number of techniques for efficiently executing various aspects of the operation of the inventory system 100. As a result, particular embodiments of the management module 115 may, by implementing one or more management techniques described below, enhance the efficiency of the inventory system 100 and/or provide other operational benefits.

Figure 6:
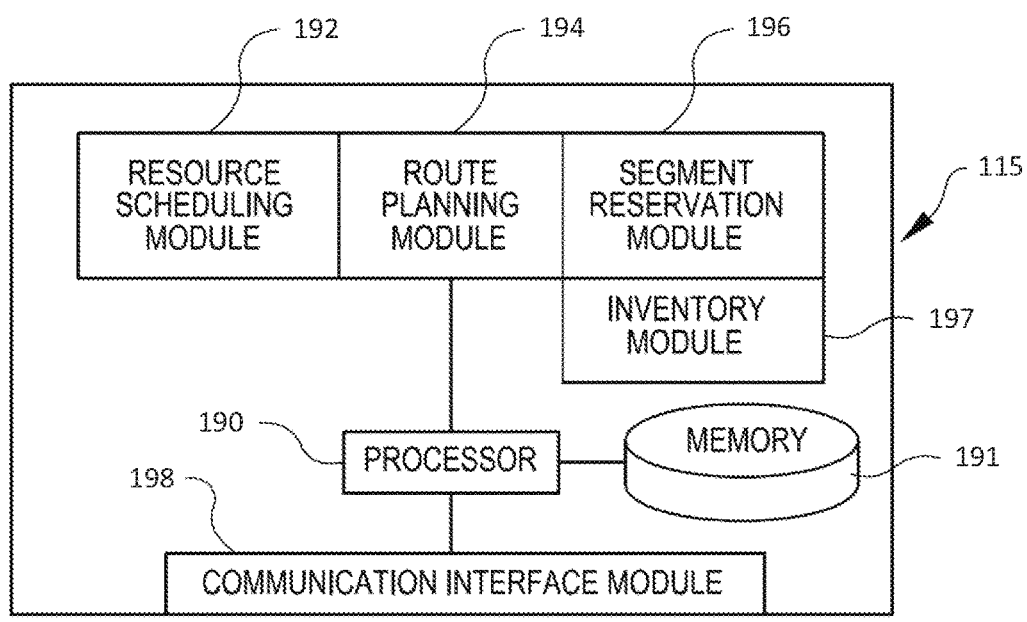
FIG. 6 illustrates in greater detail the components of an example management module that may be utilized in particular embodiments of the inventory system shown in FIG. 5.

FIG. 6 illustrates in greater detail the components of a particular embodiment of the management module 115. As shown, the example embodiment includes a resource scheduling module 192, a route planning module 194, a segment reservation module 196, an inventory module 197, a communication interface module 198, a processor 190, and a memory 191. The management module 115 may represent a single component, multiple components located at a central location within the inventory system 100, or multiple components distributed throughout the inventory system 100. For example, the management module 115 may represent components of one or more mobile drive units 120 that are capable of communicating information between the mobile drive units 120 and coordinating the movement of the mobile drive units 120 within the workspace 170. In general, the management module 115 may include any appropriate combination of hardware and/or software suitable to provide the described functionality.

The processor 190 is operable to execute instructions associated with the functionality provided by the management module 115. The processor 190 may comprise one or more general purpose computers, dedicated microprocessors, or other processing devices capable of communicating electronic information. Examples of the processor 190 include one or more application-specific integrated circuits (ASICs), field programmable gate arrays (FPGAs), digital signal processors (DSPs) and any other suitable specific or general purpose processors.

The memory 191 stores processor instructions, inventory requests, reservation information, state information for the various components of the inventory system 100 and/or any other appropriate values, parameters, or information utilized by the management module 115 during operation. The memory 191 may represent any collection and arrangement of volatile or nonvolatile, local or remote devices suitable for storing data. Examples of the memory 191 include, but are not limited to, random access memory (RAM) devices, read only memory (ROM) devices, magnetic storage devices, optical storage devices or any other suitable data storage devices.

The resource scheduling module 192 processes received inventory requests and generates one or more assigned tasks to be completed by the components of the inventory system 100. The resource scheduling module 192 may also select one or more appropriate components for completing the assigned tasks and, using the communication interface module 198, communicate the assigned tasks to the relevant components. Additionally, the resource scheduling module 192 may also be responsible for generating assigned tasks associated with various management operations, such as prompting the mobile drive units 120 to recharge batteries or have batteries replaced, instructing inactive mobile drive units 120 to park in a location outside the anticipated traffic flow or a location near the anticipated site of future tasks, and/or directing the mobile drive units 120 selected for repair or maintenance to move towards a designated maintenance station.

The route planning module 194 receives route requests from the mobile drive units 120. These route requests identify one or more destinations associated with a task the requesting mobile drive unit 120 is executing. In response to receiving a route request, the route planning module 194 generates a path to one or more destinations identified in the route request. The route planning module 194 may implement any appropriate algorithms utilizing any appropriate parameters, factors, and/or considerations to determine the appropriate path. After generating an appropriate path, the route planning module 194 transmits a route response identifying the generated path to the requesting mobile drive unit 120 using the communication interface module 198.

The segment reservation module 196 receives reservation requests from the mobile drive units 120 attempting to move along paths generated by the route planning module 194. These reservation requests request the use of a particular portion of the workspace 170 (referred to herein as a "segment") to allow the requesting mobile drive unit 120 to avoid collisions with other mobile drive units 120 while moving across the reserved segment. In response to received reservation requests, the segment reservation module 196 transmits a reservation response granting or denying the reservation request to the requesting mobile drive unit 120 using the communication interface module 198.

The inventory module 197 maintains information about the location and number of the inventory items in the inventory system 100. Information can be maintained about the number of inventory items in a particular inventory holder 130, and the maintained information can include the location of those inventory items in the inventory holder 130. The inventory module 197 can also communicate with the mobile drive units 120, utilizing task assignments 118 to maintain, replenish or move the inventory items within the inventory system 100.

The communication interface module 198 facilitates communication between the management module 115 and other components of the inventory system 100, including reservation responses, reservation requests, route requests, route responses, and task assignments. These reservation responses, reservation requests, route requests, route responses, and task assignments may represent communication of any form appropriate based on the capabilities of the management module 115 and may include any suitable information. Depending on the configuration of the management module 115, the communication interface module 198 may be responsible for facilitating either or both of wired and wireless communication between the management module 115 and the various components of the inventory system 100. In particular embodiments, the management module 115 may communicate using communication protocols such as 802.11, Bluetooth, or Infrared Data Association (IrDA) standards. Furthermore, the management module 115 may, in particular embodiments, represent a portion of the mobile drive unit 120 or other components of the inventory system 100. In such embodiments, the communication interface module 198 may facilitate communication between the management module 115 and other parts of the same system component.

In general, the resource scheduling module 192, the route planning module 194, the segment reservation module 196, the inventory module 197, and the communication interface module 198 may each represent any appropriate hardware and/or software suitable to provide the described functionality. In addition, as noted above, the management module 115 may, in particular embodiments, represent multiple different discrete components and any or all of the resource scheduling module 192, the route planning module 194, the segment reservation module 196, the inventory module 197, and the communication interface module 198 may represent components physically separate from the remaining elements of the management module 115. Moreover, any two or more of the resource scheduling module 192, the route planning module 194, the segment reservation module 196, the inventory module 197, and the communication interface module 198 may share common components. For example, in particular embodiments, the resource scheduling module 192, the route planning module 194, the segment reservation module 196, and the inventory module 197 represent computer processes executing on the processor 190 and the communication interface module 198 comprises a wireless transmitter, a wireless receiver, and a related computer process executing on the processor 190.

Figure 7:
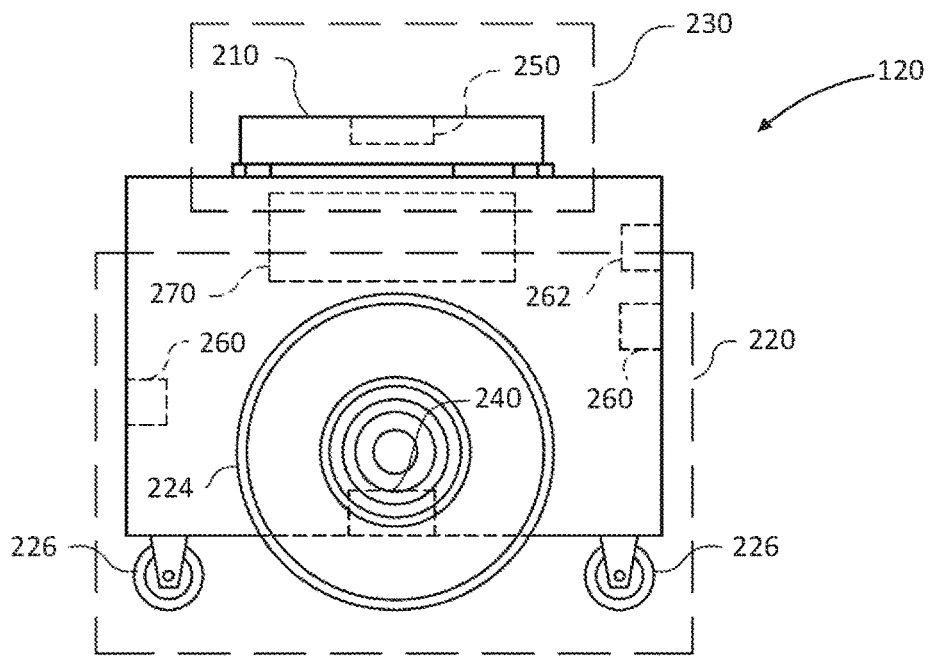
FIGS. 7 and 8 illustrate in greater detail an example mobile drive unit that may be utilized in particular embodiments of the inventory system shown in FIG. 5.
Figure 8:
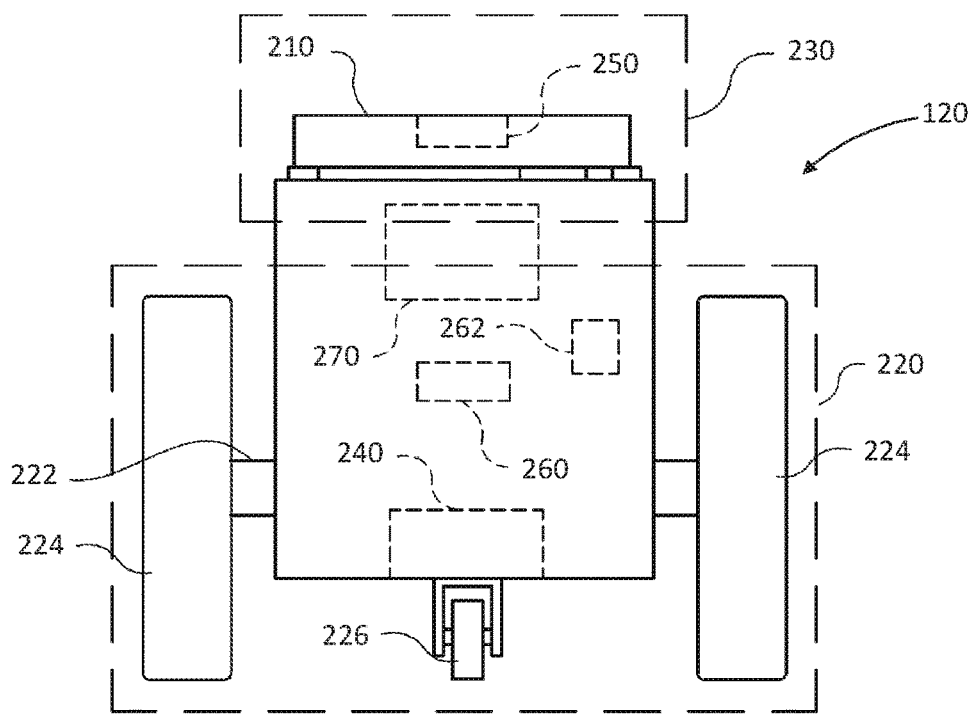

FIGS. 7 and 8 illustrate in greater detail the components of a particular embodiment of the mobile drive unit 120. In particular, FIGS. 7 and 8 include a front and side view of an example mobile drive unit 120. The mobile drive unit 120 includes a docking head 210, a drive module 220, a docking actuator 230, and a control module 270. Additionally, the mobile drive unit 120 may include one or more sensors configured to detect or determine the location of the mobile drive unit 120, the inventory holder 130, and/or other appropriate elements of the inventory system 100. In the illustrated embodiment, the mobile drive unit 120 includes a position sensor 240, a holder sensor 250, an obstacle sensor 260, and an identification signal transmitter 262.

The docking head 210, in particular embodiments of the mobile drive unit 120, couples the mobile drive unit 120 to the inventory holder 130 and/or supports the inventory holder 130 when the mobile drive unit 120 is docked to the inventory holder 130. The docking head 210 may additionally allow the mobile drive unit 120 to maneuver the inventory holder 130, such as by lifting the inventory holder 130, propelling the inventory holder 130, rotating the inventory holder 130, and/or moving the inventory holder 130 in any other appropriate manner. The docking head 210 may also include any appropriate combination of components, such as ribs, spikes, and/or corrugations, to facilitate such manipulation of the inventory holder 130. For example, in particular embodiments, the docking head 210 may include a high-friction portion that abuts a portion of the inventory holder 130 while the mobile drive unit 120 is docked to the inventory holder 130. In such embodiments, frictional forces created between the high-friction portion of the docking head 210 and a surface of the inventory holder 130 may induce translational and rotational movement in the inventory holder 130 when the docking head 210 moves and rotates, respectively. As a result, the mobile drive unit 120 may be able to manipulate the inventory holder 130 by moving or rotating the docking head 210, either independently or as a part of the movement of the mobile drive unit 120 as a whole.

The drive module 220 propels the mobile drive unit 120 and, when the mobile drive unit 120 and the inventory holder 130 are docked, the inventory holder 130. The drive module 220 may represent any appropriate collection of components operable to propel the mobile drive unit 120. For example, in the illustrated embodiment, the drive module 220 includes a motorized axle 222, a pair of motorized wheels 224, and a pair of stabilizing wheels 226. One motorized wheel 224 is located at each end of the motorized axle 222, and one stabilizing wheel 226 is positioned at each end of the mobile drive unit 120.

The docking actuator 230 moves the docking head 210 towards the inventory holder 130 to facilitate docking of the mobile drive unit 120 and the inventory holder 130. The docking actuator 230 may also be capable of adjusting the position or orientation of the docking head 210 in other suitable manners to facilitate docking. The docking actuator 230 may include any appropriate components, based on the configuration of the mobile drive unit 120 and the inventory holder 130, for moving the docking head 210 or otherwise adjusting the position or orientation of the docking head 210. For example, in the illustrated embodiment, the docking actuator 230 includes a motorized shaft (not shown) attached to the center of the docking head 210. The motorized shaft is operable to lift the docking head 210 as appropriate for docking with the inventory holder 130.

The drive module 220 may be configured to propel the mobile drive unit 120 in any appropriate manner. For example, in the illustrated embodiment, the motorized wheels 224 are operable to rotate in a first direction to propel the mobile drive unit 120 in a forward direction. The motorized wheels 224 are also operable to rotate in a second direction to propel the mobile drive unit 120 in a backward direction. In the illustrated embodiment, the drive module 220 is also configured to rotate the mobile drive unit 120 by rotating the motorized wheels 224 in different directions from one another or by rotating the motorized wheels 224 at different speeds from one another.

The position sensor 240 represents one or more sensors, detectors, or other components suitable for determining the location of the mobile drive unit 120 in any appropriate manner. For example, in particular embodiments, the workspace 170 associated with the inventory system 100 includes a number of fiducial marks that mark points on a two-dimensional grid that covers all or a portion of the workspace 170. In such embodiments, the position sensor 240 may include a camera and suitable image- and/or video-processing components, such as an appropriately-programmed digital signal processor, to allow the position sensor 240 to detect fiducial marks within the camera's field of view. The control module 270 may store location information that the position sensor 240 updates as the position sensor 240 detects fiducial marks. As a result, the position sensor 240 may utilize fiducial marks to maintain an accurate indication of the location of the mobile drive unit 120 and to aid in navigation when moving within the workspace 170.

The holder sensor 250 represents one or more sensors, detectors, or other components suitable for detecting the inventory holder 130 and/or determining, in any appropriate manner, the location of the inventory holder 130, as an absolute location or as a position relative to the mobile drive unit 120. The holder sensor 250 may be capable of detecting the location of a particular portion of the inventory holder 130 or the inventory holder 130 as a whole. The mobile drive unit 120 may then use the detected information for docking with or otherwise interacting with the inventory holder 130.

The obstacle sensor 260 represents one or more sensors capable of detecting objects located in one or more different directions in which the mobile drive unit 120 is capable of moving. The obstacle sensor 260 may utilize any appropriate components and techniques, including optical, radar, sonar, pressure-sensing and/or other types of detection devices appropriate to detect objects located in the direction of travel of the mobile drive unit 120. In particular embodiments, the obstacle sensor 260 may transmit information describing objects it detects to the control module 270 to be used by the control module 270 to identify obstacles and to take appropriate remedial actions to prevent the mobile drive unit 120 from colliding with obstacles and/or other objects.

The obstacle sensor 120 may also detect signals transmitted by other mobile drive units 120 operating in the vicinity of the illustrated mobile drive unit 120. For example, in particular embodiments of the inventory system 100, one or more mobile drive units 120 may include an identification signal transmitter 262 that transmits a drive identification signal. The drive identification signal indicates to other mobile drive units 120 that the object transmitting the drive identification signal is in fact a mobile drive unit. The identification signal transmitter 262 may be capable of transmitting infrared, ultraviolet, audio, visible light, radio, and/or other suitable signals that indicate to recipients that the transmitting device is a mobile drive unit 120.

Additionally, in particular embodiments, the obstacle sensor 260 may also be capable of detecting state information transmitted by other mobile drive units 120. For example, in particular embodiments, the identification signal transmitter 262 may be capable of including state information relating to the mobile drive unit 120 in the transmitted identification signal. This state information may include, but is not limited to, the position, velocity, direction, and the braking capabilities of the transmitting mobile drive unit 120. In particular embodiments, the mobile drive unit 120 may use the state information transmitted by other mobile drive units to avoid collisions when operating in close proximity with those other mobile drive units.

The control module 270 monitors and/or controls operation of the drive module 220 and the docking actuator 230. The control module 270 may also receive information from sensors such as the position sensor 240 and the holder sensor 250 and adjust the operation of the drive module 220, the docking actuator 230, and/or other components of the mobile drive unit 120 based on this information. Additionally, in particular embodiments, the mobile drive unit 120 may be configured to communicate with a management device of the inventory system 100 and the control module 270 may receive commands transmitted to the mobile drive unit 120 and communicate information back to the management device utilizing appropriate communication components of the mobile drive unit 120. The control module 270 may include any appropriate hardware and/or software suitable to provide the described functionality. In particular embodiments, the control module 270 includes a general-purpose microprocessor programmed to provide the described functionality. Additionally, the control module 270 may include all or portions of the docking actuator 230, the drive module 220, the position sensor 240, and/or the holder sensor 250, and/or share components with any of these elements of the mobile drive unit 120.

Moreover, in particular embodiments, the control module 270 may include hardware and software located in components that are physically distinct from the device that houses the drive module 220, the docking actuator 230, and/or the other components of the mobile drive unit 120 described above. For example, in particular embodiments, each mobile drive unit 120 operating in the inventory system 100 may be associated with a software process (referred to here as a "drive agent") operating on a server that is in communication with the device that houses the drive module 220, the docking actuator 230, and other appropriate components of the mobile drive unit 120. This drive agent may be responsible for requesting and receiving tasks, requesting and receiving routes, transmitting state information associated with the mobile drive unit 120, and/or otherwise interacting with the management module 115 and other components of the inventory system 100 on behalf of the device that physically houses the drive module 220, the docking actuator 230, and the other appropriate components of the mobile drive unit 120. As a result, for the purposes of this description and the claims that follow, the term "mobile drive unit" includes software and/or hardware, such as agent processes, that provides the described functionality on behalf of the mobile drive unit 120 but that may be located in physically distinct devices from the drive module 220, the docking actuator 230, and/or the other components of the mobile drive unit 120 described above.

While FIGS. 7 and 8 illustrate a particular embodiment of the mobile drive unit 120 containing certain components and configured to operate in a particular manner, the mobile drive unit 120 may represent any appropriate component and/or collection of components configured to transport and/or facilitate the transport of the inventory holders 130. As another example, the mobile drive unit 120 may represent part of an overhead crane system in which one or more crane assemblies are capable of moving within a network of wires or rails to a position suitable to dock with a particular inventory holder 130. After docking with the inventory holder 130, the crane assembly may then lift the inventory holder 130 and move inventory to another location for purposes of completing an assigned task.

Furthermore, in particular embodiments, the mobile drive unit 120 may represent all or a portion of the inventory holder 130. The inventory holder 130 may include motorized wheels or any other components suitable to allow the inventory holder 130 to propel itself. As one specific example, a portion of the inventory holder 130 may be responsive to magnetic fields. The inventory system 100 may be able to generate one or more controlled magnetic fields capable of propelling, maneuvering and/or otherwise controlling the position of the inventory holder 130 as a result of the responsive portion of the inventory holder 130. In such embodiments, the mobile drive unit 120 may represent the responsive portion of the inventory holder 130 and/or the components of the inventory system 100 responsible for generating and controlling these magnetic fields. While this description provides several specific examples, the mobile drive unit 120 may, in general, represent any appropriate component and/or collection of components configured to transport and/or facilitate the transport of the inventory holders 130.

Figure 9:
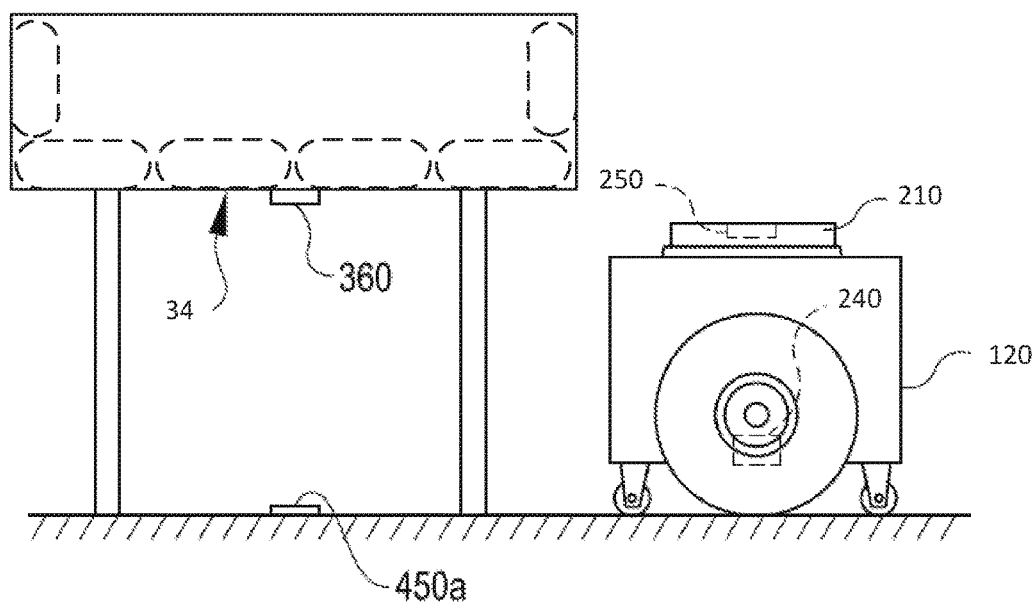
FIG. 9 illustrates in greater detail an example catching member that may be utilized in particular embodiments of the inventory system shown in FIG. 5.
Figure 10:
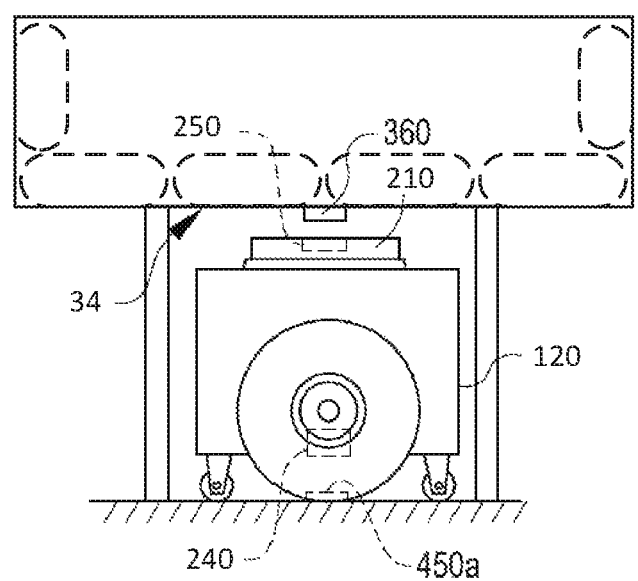
FIGS. 10 and 11 show operation of various components of the mobile drive unit and the catching member during docking, movement and undocking.
Figure 11:
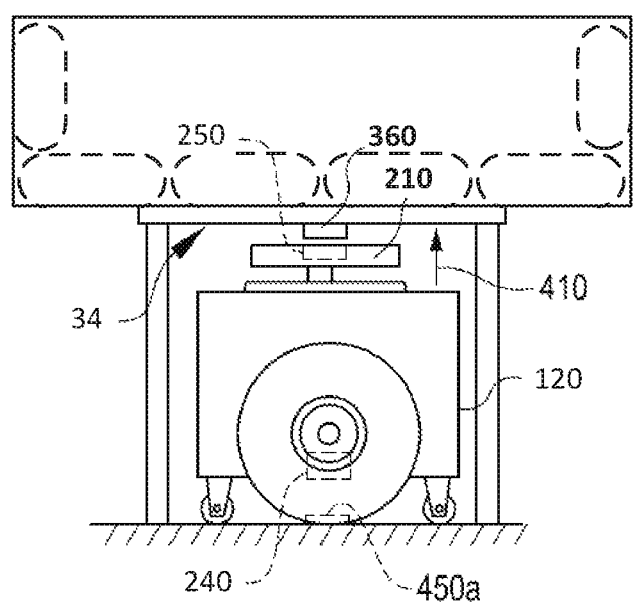
Figure 12:
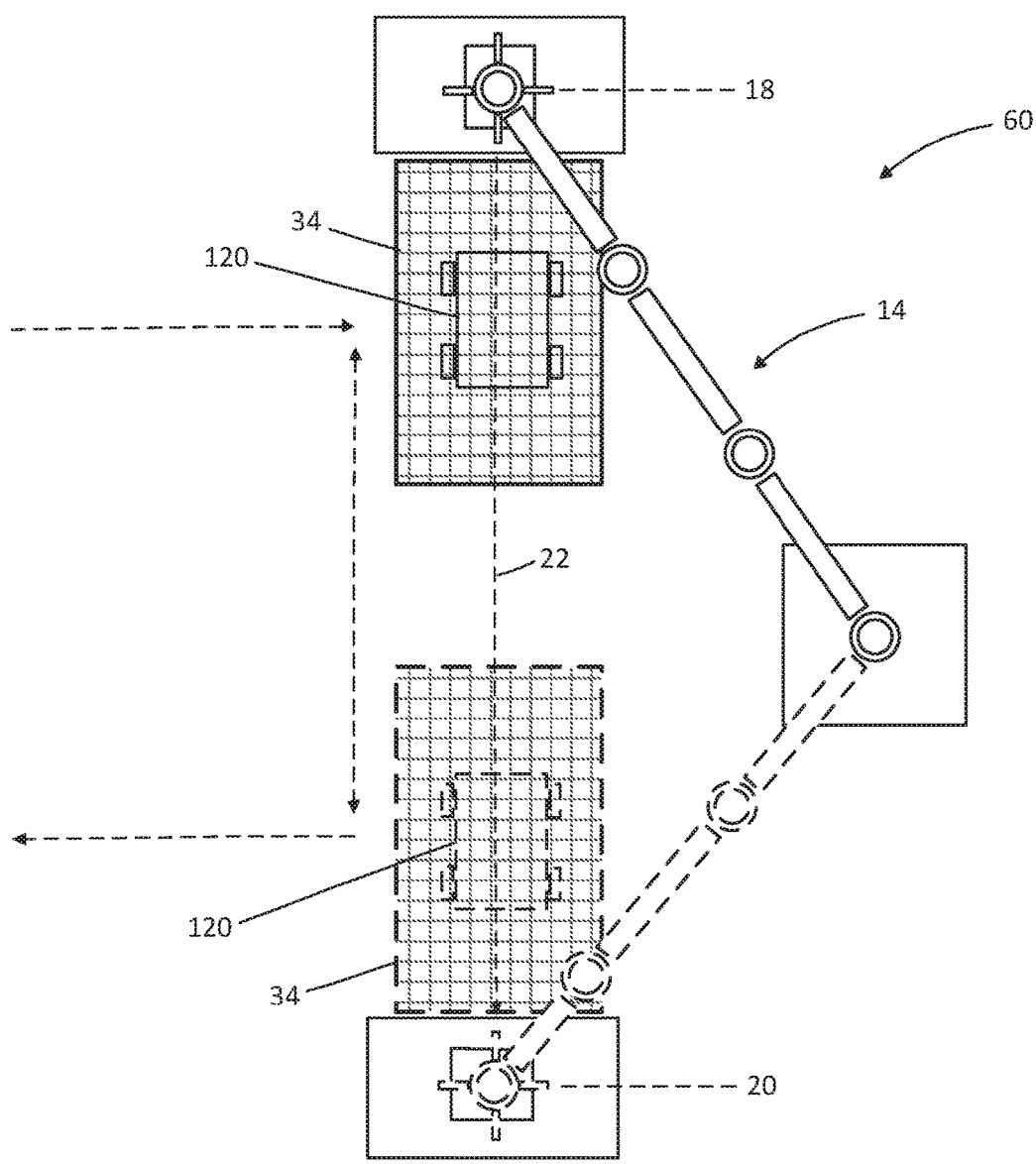
FIG. 12 illustrates moving an item with a robotic manipulator and moving a catching member with a mobile drive unit to position the catching member to catch the item if dropped by the robotic manipulator, in accordance with many embodiments.

In a similar manner to the transportation of inventory holders 130 by the mobile drive units 120, a mobile drive unit 120 can be used to move a catching member 34 as described herein and illustrated in FIG. 12. FIGS. 9-11 illustrate operation of particular embodiments of the mobile drive unit 120 and the catching member 34 during docking, movement, and undocking.

FIG. 9 illustrates the mobile drive unit 120 and catching member 34 prior to docking. The mobile drive unit 120 can receive a command that identifies a location for a particular catching member 34. The mobile drive unit 120 may then move to the location specified in the command. Additionally, the mobile drive unit 120 may utilize position sensor 240 to determine the location of the mobile drive unit 120 to assist in navigating to the location of the catching member 34.

In particular, FIG. 9 shows the mobile drive unit 120 and catching member 34 as the mobile drive unit 120 approaches the location of the catching member 34 identified by the received command. In the illustrated embodiment, the reference point is marked by fiducial mark 450A, which comprises a surface operable to reflect light and which, as a result, can be detected by particular embodiments of the position sensor 240 when the mobile drive unit 120 is positioned over or approximately over fiducial mark 450A. As noted above, the illustrated embodiment of the mobile drive unit 120 utilizes optical sensors, including a camera and appropriate image- and/or video processing components, to detect the fiducial marks 450.

FIG. 10 illustrates the mobile drive unit 120 and catching member 34 once the mobile drive unit 120 reaches fiducial mark 450A. Because, in the illustrated example, the fiducial mark 450A marks the location of the reference point to which the mobile drive unit 120 is destined, the mobile drive unit 120 begins the docking process once the mobile drive unit 120 reaches the fiducial mark 450A. In the illustrated example, the mobile drive unit 120 is configured to dock with catching member 34 from a position beneath the catching member 34 and, as a result, the catching member 34 is stored so that docking surface 360 is located directly above the fiducial mark 450A.

FIG. 11 illustrates operation of the mobile drive unit 20 in docking with catching member 34. After positioning itself over fiducial mark 450A, the mobile drive unit 120 begins the docking process. In the illustrated example, the docking process includes the mobile drive unit 120 raising the docking head 210 towards the docking surface 360, as indicated by arrow 410. Additionally, in the illustrated example, the mobile drive unit 120 and the catching member 34 are configured so that the mobile drive unit 120 lifts the catching member 34 off the ground when the mobile drive unit 120 docks with the catching member 34 and, as a result, the mobile drive unit 120 supports the weight of the catching member 34 while the mobile drive unit 120 is docked to the catching member 34.

The mobile drive unit 20 is capable of inducing translational and/or rotational movement in catching member 34 while mobile drive unit 120 is docked with catching member 34. For example, the mobile drive unit 120 is capable of inducing translational and/or rotational movement in catching member 34 by moving or rotating itself or some subcomponent of itself, such as docking head 210. As a result, while the mobile drive unit 120 and the catching member 34 are docked the mobile drive unit 120 may move the catching member 34 in accordance with commands received by the mobile drive unit 120 from the management module 115. Accordingly, the catching member 34 can be moved in coordination with movement of the item 12 by the first robotic manipulator 14 to position the catching member 34 to catch the item 12 if dropped by the first robotic manipulator 14 prior to reaching the second location 20.

FIG. 12 illustrates a robotic system 60 for moving items (e.g., item 12) within an inventory system, in accordance with many embodiments. Similar to the robotic systems 10, 50, the robotic system 60 includes the first robotic manipulator 14 for moving an item 12 from a first location 18 to a second location 20 along a movement path 22. The robotic system 60 includes a catching member 34 and a mobile drive unit 120 operable to move the catching member 34 in coordination with the movement of the item 12 to position the catching member 34 to catch the item 12 if dropped by the first robotic manipulator 14 prior to reaching the second location 20.

The mobile drive unit 120 can be operated to move the catching member 34 in any suitable manner. For example, the mobile drive unit 120 can repeatedly move the catching member 34 along the movement path 22 toward the second location 20 in coordination with the movement of the item 12 by the first robotic manipulator 14 and then move back adjacent to the starting position 18 in preparation for the movement of another item. As described herein with respect to robotic systems 10, 50, the mobile drive unit 120 may selectively move the catching member 34 in coordination with movement of only certain items by the first robotic manipulator, e.g., based on characteristics of the items being transferred. When the catching member 34 holds any suitable number of dropped items, the mobile drive unit 120 can move the catching member to another location for exception processing of the dropped items and another mobile drive unit 120 can move another catching member 34 into position to catch any items that may be dropped by the first robotic manipulator 14.

Figure 13:
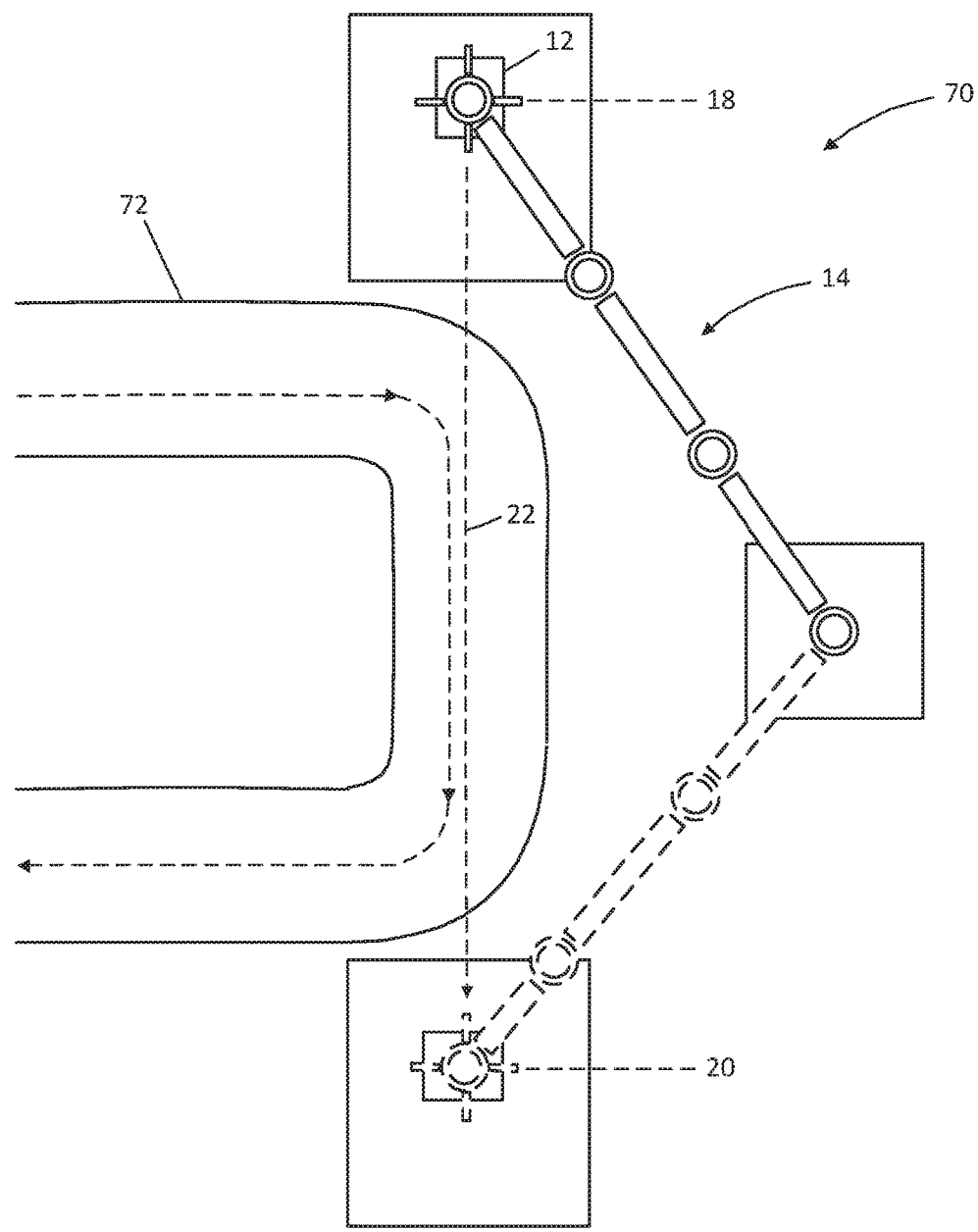
FIG. 13 illustrates moving an item with a robotic manipulator and a conveyor assembly positioned to catch the item if dropped by the robotic manipulator, in accordance with many embodiments.

FIG. 13 illustrates a robotic system 70 for moving items (e.g., item 12) within an inventory system, in accordance with many embodiments. Similar to the robotic systems 10, 50, 60, the robotic system 70 includes the first robotic manipulator 14 for moving an item 12 from a first location 18 to a second location 20 along a movement path 22. The robotic system 70 includes a conveyor assembly 72 configured to catch the item 12 if dropped by the first robotic manipulator 14 prior to reaching the second location 20 and convey the item 12 away to a location suitable for exception processing of the dropped item. As described herein with respect to robotic systems 10, 50, the first robotic manipulator 14 may selectively move only certain items along the movement path 22 over the conveyor assembly 72, e.g., based on characteristics of the items being transferred, while other items may be moved via other movement paths that are not over the conveyor assembly 72.

Alternatively or additionally, in any of the robotic systems 10, 50, 60, 70 described herein, the first robotic manipulator 14 or another robotic manipulator may be configured to retrieve dropped items directly from the catching member 34 or the conveyor assembly 72 instead of transferring any dropped items to a different location, e.g., collector tote 46 or other processing area, for exception processing. That is, the detection of one or more dropped items, by any of the first robotic manipulator 14, second robotic manipulator 16, catching member 34, mobile drive unit 120 or conveyor assembly 72, may trigger additional instructions for the first robotic manipulator 14 or another robotic manipulator to retrieve the dropped items directly from the catching member 34 or the conveyor assembly 72. In this regard, to detect dropped items, the robotic systems 50, 60, 70 may include any one or a combination of sensors described herein with reference to robotic system 10.

Figure 14:
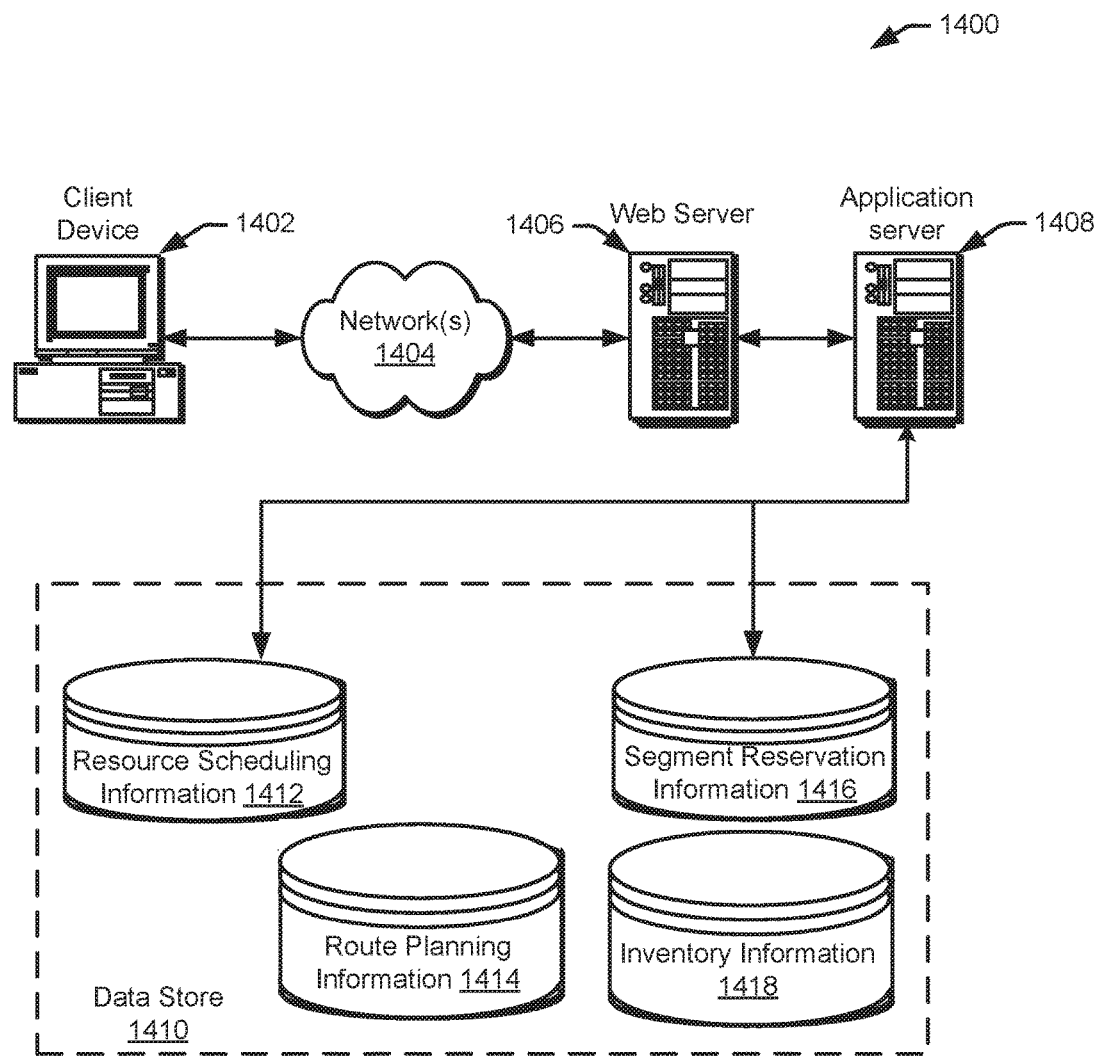
FIG. 14 illustrates an environment in which various features of the inventory system can be implemented, in accordance with at least one embodiment.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing information which can be used by modules described herein, such as resource scheduling information 1412, route planning information 1414, segment reservation information 1416, and/or inventory information 1418. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
  a first robotic manipulator configured to grasp an item of a plurality of items, move the item from a first location to a second location and release the item at the second location; the plurality of items including at least some items that differ from one another;
  a catching member that is moved in coordination with the movement of the item by the first robotic manipulator to position the catching member to catch the item if dropped by the first robotic manipulator prior to the item reaching the second location;
  one of
    a second robotic manipulator configured to move the catching member in coordination with the movement of the item by the first robotic manipulator; and
    a mobile drive unit configured to dock with the catching member and operable to move the catching member in coordination with the movement of the item by the first robotic manipulator and move the catching member independent of the first robotic manipulator to move the catching member to another location for exception processing of dropped items in the catching member so that another mobile drive unit can move another catching member into position to catch an item dropped by the first robotic manipulator; and
  a management module configured to:
    generate instructions to cause the first robotic manipulator to grasp the item at the first location and move the item to the second location; and
    generate instructions to cause the second robotic manipulator or the mobile drive unit to move the catching member in coordination with the movement of the item by the first robotic manipulator to position the catching member to catch the item if dropped by the first robotic manipulator prior to the item reaching the second location.

2. The inventory management system of claim 1, comprising the second robotic manipulator.

3. The inventory management system of claim 1, comprising the mobile drive unit.

4. The inventory management system of claim 1, wherein the management module is configured to:
  determine whether the item being moved from the first location towards the second location has been dropped by the first robotic manipulator based on input received by the management module indicative that the item has been dropped; and
  in response to a determination that the item being moved from the first location towards the second location has been dropped by the first robotic manipulator, generate instructions to cause the dropped item to be moved from the catching member.

5. The inventory management system of claim 4, further comprising at least one of:
  a weight sensor coupled with the catching member and configured to generate a weight sensor signal indicative of an item being caught by the catching member, wherein the input received by the management module indicative of whether the item has been dropped is based on the weight sensor signal;
  a light source and a light sensor, the light source generating a light beam incident on the light sensor, the light sensor generating a light sensor signal indicative of whether an item has been dropped by the first robotic manipulator and at least temporarily blocks at least a portion of the light beam from being incident upon the light sensor, wherein the input received by the management module indicative of whether the item has been dropped is based on the light sensor signal;
  a vision sensor generating a vision sensor signal indicative of whether the item being moved from the first location to the second location by the first robotic manipulator has reached or not reached the second location, wherein the input received by the management module indicative of whether the item has been dropped is based on the vision sensor signal; or
  a grasp sensor coupled with the first robotic manipulator and generating a signal indicative of whether the item is or is not being grasped by the first robotic manipulator, wherein the input received by the management module indicative of whether the item has been dropped is based on the vision sensor signal.

6. An inventory management system, comprising:
  a first robotic manipulator configured to move an item from a first location to a second location;
  a catching member configured to catch the item if dropped by the first robotic manipulator prior to the item reaching the second location, the catching member being configured to be moved to carry the dropped item to a suitable location for subsequent processing; and
  a management module configured to:
    generate instructions to cause the first robotic manipulator to grasp the item at the first location and move the item to the second location;
    determine whether the item being moved from the first location towards the second location has been dropped by the first robotic manipulator based on input received by the management module indicative that the item has been dropped;
    in response to determining that the item being moved by the first robotic manipulator has been dropped, generate instructions relating to subsequent processing of the dropped item; and
    generate instructions to cause any items held by the catching member to be moved to a suitable location for subsequent processing.

7. The inventory management system of claim 6, further comprising at least one of:
  a first weight sensor coupled with the first robotic manipulator and configured to generate a first weight sensor signal indicative of an item being dropped by the first robotic manipulator;
  a second weight sensor coupled with the catching member and configured to generate a second weight sensor signal indicative of an item being caught by the catching member;
  a light source and a light sensor, the light source generating a light beam incident on the light sensor, the light sensor generating a light sensor signal indicative of whether an item has been dropped by the first robotic manipulator;
  a vision sensor generating a vision sensor signal indicative of whether the item being moved by the first robotic manipulator has reached or not reached the second location; or
  a grasp sensor generating a signal indicative of whether the item is or is not being grasped by the first robotic manipulator.

8. The inventory management system of claim 6, further comprising a mobile drive unit configured to move the catching member to the suitable location for subsequent processing of any items held by the catching member.

9. The inventory management system of claim 6, further comprising a mobile drive unit configured to move the catching member, and wherein the management module is configured to generate instructions to cause the mobile drive unit to move the catching member in coordination with the movement of the item by the first robotic manipulator to position the catching member to catch the item if dropped by the first robotic manipulator prior to the item reaching the second location.

10. The inventory management system of claim 6, wherein the management module is configured to generate instructions to cause the first robotic manipulator to grasp an item held by the catching member, move the item to the second location, and release the item at the second location.

11. The inventory management system of claim 6, wherein the catching member is included in a conveyance apparatus configured for continuous movement of any items dropped by the first robotic manipulator to the suitable location for subsequent processing.

12. The inventory management system of claim 6, further comprising a second robotic manipulator configured to move the catching member, and wherein the management module is configured to:
  determine, based on one or more parameters for an item to be moved by the first robotic manipulator, whether to activate the second robotic manipulator to move the catching member in coordination with the movement of the item by the first robotic manipulator; and
  in response to determining to activate the second robotic manipulator, generate instructions to cause the second robotic manipulator to move the catching member in coordination with the movement of the item by the first robotic manipulator.

13. The inventory management system of claim 6, further comprising a second robotic manipulator configured to move the catching member in coordination with the movement of the item by the first robotic manipulator.

14. The inventory management system of claim 13, wherein the second robotic manipulator is configured to cause an item caught by the catching member to move from the catching member to the suitable location for subsequent processing.

15. The inventory management system of claim 13, wherein the second robotic manipulator is physically integrated with the first robotic manipulator.

16. A computer-implemented method comprising:
  generating instructions via a management module to control operation of a first robotic manipulator to move an inventory item within an inventory facility from a first location to a second location;
  generating instructions via the management module to control operation of a second robotic manipulator to move a catching member in coordination with the movement of the inventory item by the first robotic manipulator to catch the inventory item if dropped by the first robotic manipulator prior to the item reaching the second location; and
  generating instructions via the management module to control operation of the second robotic manipulator moving the catching member to a suitable location for subsequent processing of one or more items dropped by the first robotic manipulator into the catching member.

17. The computer-implemented method of claim 16, further comprising:
  generating instructions via the management module to control operation of a third robotic manipulator to move a second inventory item within the inventory facility from a third location to a fourth location; and
  generating instructions via the management module to control operation of the second robotic manipulator to move the catching member in coordination with the movement of the second inventory item by the third robotic manipulator.

18. The computer-implemented method of claim 17, further comprising:
  selecting, by the management module, based on one or more parameters of the inventory item and the second inventory item to be moved, one of the first robotic manipulator or the third robotic manipulator; and
  generating instructions via the management module to control operation of the second robotic manipulator to move the catching member in coordination with the movement of the inventory item or the second inventory item by the respective selected one of the first robotic manipulator or the third robotic manipulator.

* * * * *